United States Patent [19]

Wycech

[11] Patent Number: 4,836,516

[45] Date of Patent: Jun. 6, 1989

[54] FILLED TUBULAR TORSION BAR AND ITS METHOD OF MANUFACTURE

[75] Inventor: Joseph Wycech, Grosse Pointe Woods, Mich.

[73] Assignee: Essex Composite Systems, Fraser, Mich.

[21] Appl. No.: 185,729

[22] Filed: Apr. 25, 1988

[51] Int. Cl.$^4$ .................... B60G 11/22; F16F 1/48
[52] U.S. Cl. .................. 267/279; 267/154; 267/284; 267/149; 280/717; 280/721
[58] Field of Search .................. 267/273–285, 267/154–157, 188–191, 36.1, 47, 141, 143, 148, 149; 280/721, 723, 695, 700, 717; 148/12 B; 74/607; 428/323, 313.3–313.9, 407

[56] References Cited

U.S. PATENT DOCUMENTS

| | | | |
|---|---|---|---|
| 3,545,737 | 12/1970 | Lamprey et al. | 267/141 |
| 4,415,178 | 11/1983 | Hatsushi et al. | 280/721 X |
| 4,666,372 | 5/1987 | Avila et al. | 267/279 |
| 4,706,788 | 11/1987 | Inman et al. | 267/279 X |
| 4,737,407 | 4/1988 | Wycech | 428/323 |
| 4,751,249 | 6/1988 | Wycech | 521/54 |

Primary Examiner—Douglas C. Butler
Attorney, Agent, or Firm—Dykema Gossett

[57] ABSTRACT

A hollow torsion bar reinforced by a mixture of resin and filler and method of making such a torsion bar. The torsion bar is formed from mild or medium grade steel seamless or welded tubing. The tubing is cut to length and charged preferably with a mixture of substantially uncured thermoset resin and plastic or glass hollow microspheres and/or metal pellets. The mixture may be charged into the tube by injection as a paste or by placing inside the tube a B-stage form insert having preferably between about 10 and 50 percent elongation tensile strength. After the tube has been charged with the reinforcing mixture, the tube is bent to form a torsion bar having a radius arm and a spring portion. In areas that the torsion bar is bent, the reinforcing mixture is provided to act as an internal mandrel preventing collapse of the tube walls. The mixture is then cured and bonded in place by chemical reaction of the rein or by thermally curing the resin mixture within the tube. The mixture, upon curing, bonds to the walls of the tube and increases in compressive and shear strength and has a lower percent elongation. Bonding to the tube walls may inherently occur if the resin used in the mixture is an epoxy resin. The mixture imparts substantial vibration damping and acoustic attenuation. In one aspect, the core constitutes a plurality of bonded-together plastic syntactic pellets which define a network of interstices rendering the torsion bar even more lightweight and acoustically desirable.

21 Claims, 1 Drawing Sheet

FILLED TUBULAR TORSION BAR AND ITS METHOD OF MANUFACTURE

FIELD OF THE INVENTION

The present invention deals generally with torsion bars and methods of making torsion bars. More specifically, the present invention relates to high-strength, automotive torsion bars and their method of manufacture.

BACKGROUND OF THE INVENTION

Torsion bars are used in many applications to provide spring resistance where space is limited such as in vehicle suspension systems. In a typical torsion bar vehicle suspension system, a torsion bar is attached at one end to each front wheel. At the wheel end of the torsion bar, a control or radius arm is connected, extending radially from the longitudinal body or spring portion of the torsion bar. Although the spring portion and radius arm may be formed as separate parts which are then joined together, it is usually desirable to form the spring portion and radius arm integrally by bending a single rod. As used herein, "Torsion bar" will include its cooperating radius arm unless otherwise specified. The spring portion of the torsion bar is connected to the frame of the vehicle with a turning anchor adjacent the wheel end and solid anchor at the end opposite the wheel end. The torsion bar can rotate within the turning anchor, but is rigidly retained in the solid anchor. Hence, movement of the radius arm applies a torque to the torsion bar when the vehicle wheel rises. Since one end of the torsion bar is rigidly held by the solid anchor, the torsion bar twists in response to the applied torque. Therefore, the torsion bar must be made of a material that offers spring resistance to the twist such that it yields to the torque and then untwists in a rebound action.

Generally, torsion bars used in vehicle suspension systems are formed from a uniform solid rod of metal. Such torsion bars can be easily fabricated and do not require heat treating. However, the emphasis in recent years on reducing vehicle weight has made it desirable to reduce the weight of all parts, including torsion bars. It is known that a one-piece torsion bar is weakest at the location of any bends in the bar. Stresses are concentrated at the bends similar to the effect of a notch in a beam. When a twist is applied to the bar, the twist forces are concentrated at the bends. These stress points at the bends in the torsion bar made it necessary to use high-strength steels or heat treated steel to prevent cracking.

With the goal of weight reduction in mind, others have attempted to fabricate torsion bars from hollow tubes. One disadvantage of hollow torsion bars currently being evaluated is that the hollow tubes must be made of expensive premium grade steel such as for example a high strength, low allow (HSLA) steel. Another disadvantage in the use of hollow torsion bars is the necessity of heat treatment to improve the bar strength after it is cold formed or forged in the shape of the torsion bar. When a torsion bar is heat treated after forming, close dimension tolerances often cannot be met due to thermal distortion of the torsion bar. Heat treating also adds considerably to the cost of producing hollow torsion bars. Due to the degree of bending required to form a one-piece torsion bar, the tube must be strong enough to prevent collapse of the tube. Alternatively, a mandrel may be required to prevent the tube from collapsing during the bending process. It is also known that a hollow tube, if unreinforced, lacks vibrational stiffness which may produce unwanted acoustic resonance if the natural frequency of the hollow tube is too close to the resonant frequency of the drive train.

Other attempts to develop a functional hollow torsion bar include providing aluminum cores at the critical bends such as the angle at the solid anchor and the angle which joins the radius arm and spring portion of the torsion bar. However, use of an aluminum core at a bend provides only limited weight savings and requires a complex assembly process. Typically, the aluminum core must be press fitted within the tube. If the core dimensions do not precisely match the tube bore, the tube may split when bent or it may be impossible to insert the aluminum core into the tube. If the aluminum core is too small, it may be displaced since the aluminum core is not bonded to the tube. Also, it is known that placing aluminum cores in steel tubes causes accelerated corrosion due to the dissimilarity of the metals.

The use of rubber torsion bars has also been explored by others. These rubber torsion bars have a outer steel tube or shell and an inner steel tube or sleeve which comprises the spring portion. A rubber liner is provided between the shell and sleeve in a complex manufacturing process. While some bend strength is gained, the bar weight is increased by the use of two steel tubes and dimensions must be precise.

Therefore, it is evident that one object in the design of torsion bars is to provide a light weight, one-piece torsion bar. While a hollow torsion bar is lightweight, it must still provide strength equivalent to solid torsion bars in both compression strength and shear strength. A suitable hollow torsion bar must meet current performance specifications for solid torsion bars. A further object is to provide a torsion bar which does not suffer from excessive vibration and unwanted resonance characteristics. Of course, a suitable hollow torsion bar must be able to withstand the shocks and twisting forces exerted upon it without fracturing or loosening.

Another objective in the development of torsion bars is that the torsion bar must be simple to manufacture by a reliable process. A practical hollow torsion bar must be cost competitive with solid torsion bars and preferably less expensive than solid bars. It would also be desirable to avoid the use of expensive, high strength steels. A further objective is to eliminate the need for heat treatment to meet strength specifications. The present invention achieves these goals.

SUMMARY OF THE INVENTION

In one aspect, the present invention provides a torsion bar which includes a hollow tubular portion or bar and a reinforcing core disposed in at least a portion of the bore of the hollow tubular bar. In one embodiment, the inventive torsion bar includes an angle which defines a spring portion and a radius arm of the torsion bar. In one aspect, the core fills the entire torsion bar while in another embodiment the core occupies only those portions of the torsion bar which are angled. In this manner, the reinforcing core provides strength to those portions of the torsion bar which stress is concentrated.

The core of the torsion bar preferably comprises a resin and a filler so that the conpleted torsion bar is lightweight and yet has good mechanical strength. A preferred resin is a thermoset resin such as an epoxy resin. Preferred fillers include hollow microspheres, (either glass or plastic), metal pellets, fumed silica, milled glass fibers, calcium carbonate, and chopped glass strands. Particularly preferred are unexpanded thermally expandable microspheres. In one embodiment, plastic pellets are used to form the torsion bar core. The plastic pellets comprise a resin which is mixed with micropheres to from a lightweight, but sturdy bead structure or, alternatively, the pellets comprise a resin and a blowing agent which is activated to produce cavities in the pellets, which again provide a lightweight structure.

The torsion bar of the present invention also includes means for connecting one end of the torsion bar to a vehicle wheel assembly and means for connecting the torsion bar to the frame of the motor vehicle.

A method for fabricating the torsion bar of the present invention is also provided. In one aspect, the method includes the steps of selecting and cutting a hollow tubular bar to a predetermined length and then forming a core in at least a portion of the hollor tubular bar. Preferably, the hollow tubular bar is then shaped by bending the bar to define a spring portion and a radius arm and to form end portions which will mate appropriately with mounting locations on a motor vehicle to form part of a suspension system. The core reinforces the torsion bar during forming to prevent collapse of the hollow tubular bar and strengthens the hollow tubular bar to withstand stresses during use. In one embodiment, the core occupies only those portions of the torsion bar which are angled. It is known that stresses are concentrated at bends or angles in a torsion bar. By providing the core at these angles, the torsion bar is substantially strengthened.

In one embodiment, the core is formed in place in the bore of the precut hollow tubular bar by preparing a liquid mixture of a resin and a filler which is then injected into the bore of the hollow tubular bar, that is, the tube bore is charged with the mixture. In one preferred embodiment, the injection of the liquid material is made via an injection port in the tube wall. In this embodiment, the ends of the tube are preferably crimped shut prior to injection and an exhaust port in the tube wall is also provided. In this embodiment, the core is at least partially hardened prior to any bending of the tube to form the torsion bar structure. By allowing the core to at least partially harden, support for the tube is provided which prevents tube collapse during bending. Where a thermosetting resin is used, partial hardening is achieved by partial curing of the core and, after the torsion bar has been shaped, the core is cured to its final state.

In still another embodiment, a precast insert or a plurality of inserts are formed preferably by casting a liquid mixture containing a resin and a filler in a mold to produce an insert which is closely received within the bore of the tubular bar. A single insert may comprise the entire core with the tube bore being substantially filled or, alternatively, a plurality of inserts can be formed and inserted only at the portions of the tube which will be bent during formation of the torsion bar structure. In this embodiment, the core thus comprises multiple precast inserts. Again, where a thermosetting resin is used, the precast insert is only partially cured prior to its insertion into the tube and then is fully cured after formation of the torsion bar angles.

In still another embodiment, the aforementioned pellets or beads are used to fill the bore of the torsion bar. The filled torsion bar is then heated to partially bond the pellets together and to the inner wall of the torsion bar. The core so formed has numerous interstices which significantly reduce the overall weight of the torsion bar as well as provide good acoustical characteristics.

DETAILED DESCRIPTION OF THE INVENTION

Figures 1, 2, 3, 4:
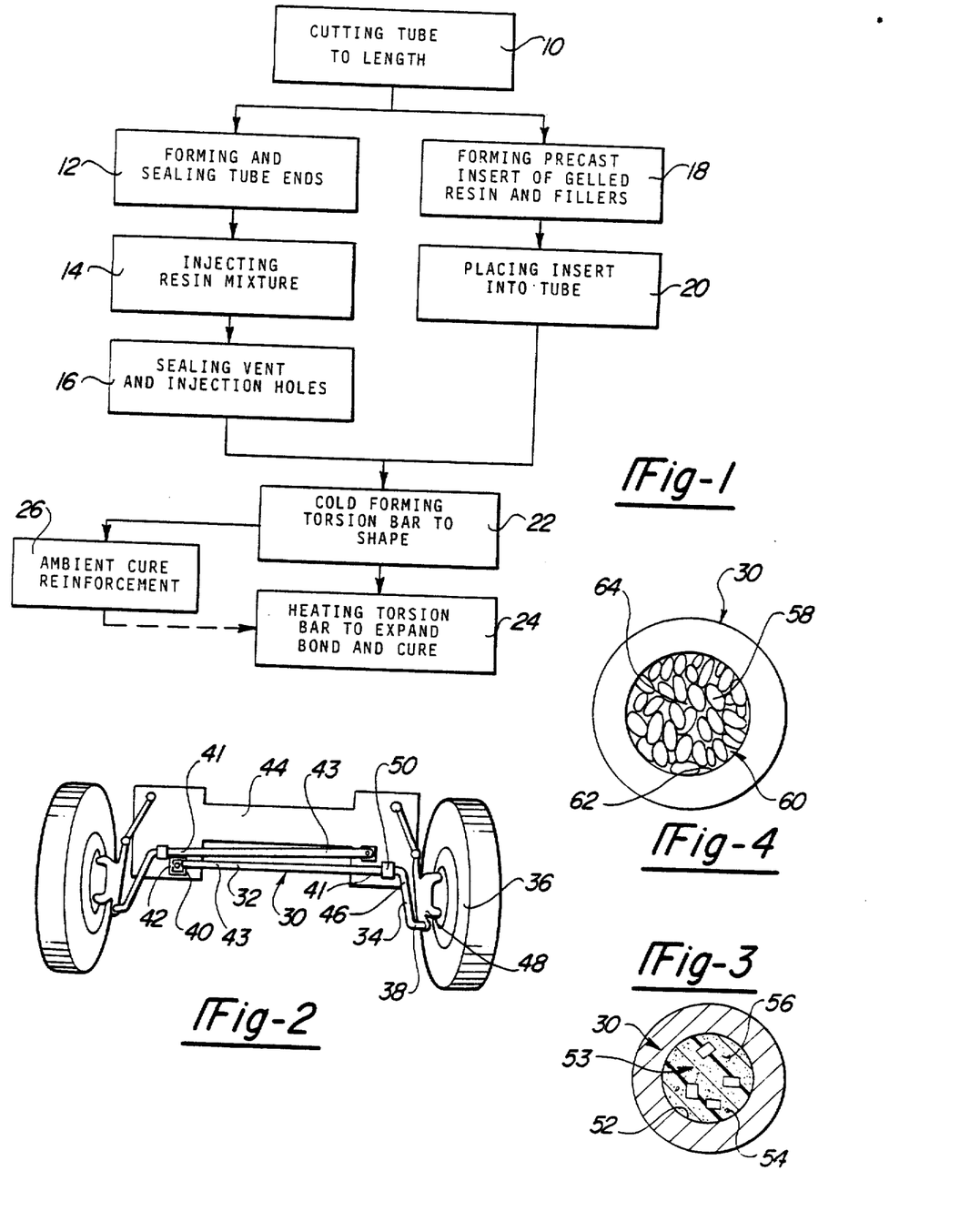
FIG. 1 is a block diagram illustrating two alternative general processes for making a torsion bar according to the present invention.
FIG. 2 is a front elevational schematic representation of torsion bars connected to vehicle wheels and a vehicle frame.
FIG. 3 is an unscaled cross-section of a filled portion of a torsion bar made in accordance with the present invention.
FIG. 4 is an unscaled cross-section of a filled portion of a torsion bar made in accordance with the present invention, where the core comprises a plurality of plastic pellets.

Referring now to FIG. 1 of the drawings, the first step 10 of the process of the present invention includes selecting a metal tube or tubing, preferably seamless or welded metal tubing, which is then cut to a predetermined length. The preferred tubing material for use in the present invention is selected from the group consisting of medium carbon steel, dual-phase steel and chrome-molybdenum steel. Other metals may be suitable for use as the preferred metal tubing so long as they provide sufficient strength and formability. The predetermined length to which the tubing is cut will be dictated by the parameters of the suspension system in which it is installed. Where the torsion bar will be used in a motor vehicle suspension system, the length of the tube would typically be from about 45 inches to about 75 inches. The diameter of the tube will also be a function of the final use of the torsion bar, but will typically be from about $\frac{3}{4}$ inch to about $1\frac{1}{2}$ inches. Good strength is obtained in the present invention where the thickness of the tube wall is from about 0.060 inch to about 0.150 inch.

After the tubing has been selected and cut to length, it is then filled with a material which serves to reinforce the tube to provide added strength over and above that provided by the hollow tube. Three methods of filling the tube are preferred for use herein. A precast insert can be prepared which is then inserted into the bore of the tube, the tube can be charged with a liquid filler which is then hardened, or the tube can be charged with a plurality of pellets which are then heat-bonded and hardened. The preferred composition for use in forming the core of the hollow tube is a resin-based material which preferably includes hollow microspheres or metal pellets. These preferred compositions will be described more fully herein.

The present invention in that embodiment wherein the tube core is formed in place by injecting a resin-based liquid mixture into the tube core will now be explained with reference to FIG. 1. Following cutting step 10 the two ends of the tube are preferably sealed shut. This may be achieved by closing the tube ends such as by crimping or the like. At this time, it is also preferred that the tube ends be shaped or stamped to form any flanges or mounting holes necessary for attaching the torsion bar to the vehicle wheel assembly and vehicle frame. At one end of the tube an injection hole is then formed. The liquid resin-based mixture will be injected through this hole into the tube bore. A corresponding vent hole is formed in the end of the tube opposite that end at which the injection hole has been formed. The vent hole is provided to allow the escape of air from the tube bore as the liquid mixture is injected. This feature of the invention minimizes injection pressure and prevents air in the tube bore from cavitating the resin based mixture. As shown in step 14, the resin based mixture is then injected into the tube bore through the injection hole. Preferably, the entire tube bore is filled with the resin based mixture. After the liquid mixture has been injected into the tube bore such that the tube is substantially filled, the injection and vent holes are closed with seals, designated in FIG. 1 as step 16. Appropriate seals can be achieved by a number of methods, however, it is preferred that the injection and vent holes be closed by applying a sufficient amount of suitable sealant such as a quick curing epoxy sealant or a thermally cured vinyl plastisol sealant. In another embodiment, the tube ends are closed after the tube bore has been filled with the liquid resin based mixture. In this embodiment, it may be necessary to use temporary plugs or the like.

Referring now to FIGS. 1 and 3 of the drawings, the composition of core 53 when formed as a precast insert or by charging with the preferred liquid resin based material imparts excellent mechanical strength to torsion bar 30, particularly to its capacity to twist and then rebound in response to an applied torque. Furthermore, core 53 adds only marginally to the overall weight of torsion bar 30. With specific reference now to the composition of core 53, the density of core 53 should be from about 30 pounds per cubic feet to about 70 pounds per cubic feet to minimize weight. Preferably, the melting point, heat distortion temperature and the temperature at which chemical breakdown of core 53 occurs is preferably sufficiently high such that core 53 substantially maintains its structure at high temperatures which may be encountered in paint ovens and the like. Therefore, core 53 should be able to withstand temperatures in excess of 300 degrees F. and preferably 350 degrees F. for short times absent any significant applied stress. Also, core 53 should be able to withstand temperatures of from about 170 degrees F. to about 220 degrees F. for extended periods without exhibiting substantial heat induced distortion or degradation.

As stated, in one embodiment core 53 is preferably formed by preparing a liquid or paste-like reinforcing material which is then injected into the tube bore in one aspect of the present invention. In that embodiment of the invention, after step 12 (forming and sealing tube ends) step 14 is carried out by injecting the resin-based mixture into the metal tube, as stated, preferably via an injection hole 41 formed in the tube wall. In step 16, the injection hole 41 and vent hole 43 are then sealed with a suitable sealant. The resin-based reinforcing material is preferably hardened in place by curing to form core 53 as will be explained more fully.

In another embodiment, and referring now to steps 18 and 20 of FIG. 1, as an alternative to forming core 53 in place, core 53 can be formed as a precast insert which is then inserted into the tube bore. Thus, in this embodiment, step 18 includes forming a precast insert, preferably of a gelled resin and filler. This is preferably achieved by injecting or pouring a liquid or paste-like resin-based composition into a mold cavity which corresponds in size and shape to the tube bore. In other words, an insert is preformed which will be closely received within the tube bore such that it contacts and supports the inner wall or surface of the tube which will be shaped to form the torsion bar. In order to reduce catastrophic failure of the torsion bar at those portions which are bent or angled (where the greatest concentration of stress occurs), multiple preformed inserts are preferably placed in the tube bore only in the regions which will be bent, shown in FIG. 2 as region or bend 38 and region or bend 40, such that core 53 comprises multiple insert sections. By limiting the core 53 to only these areas, even greater weight reduction of torsion bar 30 is achieved. Hence, following step 18, one or more preformed inserts are inserted into the tube, which is illustrated in FIG. 1 as step 20. Again the inserts are snugly fit within tube 30 to form core 53. Of course, in this embodiment, at least one end of the tube is left open such that the insert can be placed within the tube. It may be desirable in some applications to coat the insert with an efficient amount of an adhesive before the insert is placed within the tube or more preferably to coat the tube's inner surface with adhesive to help prevent any movement of core 53 within the tube. Thus, a suitable adhesive would be one which would bind both the core 53 and the inner tube wall. Suitable adhesives for this purpose will be apparent to those skilled in the art.

Turning now to the composition of core 53 (all percentages by weight unless otherwise indicated), core 53 preferably comprises in weight percent from about 50% to about 75% resin and about 50% to about 25% filler. In one preferred embodiment, the resin which is used in the present invention is a thermosetting resin, preferably selected from the group consisting of epoxy resins, vinyl ester resins, thermoset polyester resins and thermoset polyurethane resins. Particularly preferred are the epoxy resins. The average molecular weight of the resin component is preferably from about 1,000 to about 5,000,000 and more preferably from about 10,000 to about 1,000,000, although molecular weights outside of these ranges may be suitable or desirable in some applications. It is not intended that the scope of the present invention be limited by molecular weight of the resin. In those embodiment where core 53 includes a thermosetting resin, it is preferred that an accelerator and curing agent be added to the resin to enhance the cure rate. A sufficient amount of accelerator is generally from about 0.1% to about 4.0% of the resin weight. Generally from about 1% to about 4% of the resin weight is a sufficient amount of curing agent for use in the present invention.

Suitable fillers for use in the present invention include glass or plastic microspheres, fumed silica, calcium carbonate, milled glass fiber and chopped glass strands. Particularly preferred are glass or plastic microspheres, most preferably glass microspheres. Volumetrically, the ratio of filler to resin is preferably within the range of about 2.5 parts by volume filler to about 1 part by volume resin and about 4.0 parts by volume filler to about 1 part by volume resin.

In a particularly preferred embodiment, glass microspheres and most preferably heat activated unexpanded microspheres are used as the filler material. The preferred microspheres are from about 10 to about 300 microns in diameter. Effective amounts of processing aids and stabilizers may also be included in core 53. Other additives such as surfactants, lubricants, or diluents may be included to aid in the extrusion of the resin-based composition when the tube or mold cavity is filled. Also, as an alternative to coating core 53 with an adhesive, it may be desirable to coat the inner wall of the tube with an adhesive such as an epoxy resin adhesive to improve the bond strength between the core 53 and the tube. This alternative is compatible with both the method of the invention in which core 53 is preformed or precast and then inserted into the tube bore and also in that embodiment in which core 53 is formed in place in the tube by injection of a liquid resin-based mixture which is provided in the present invention. Where the present invention includes the use of a thermosetting resin, the filler and resin are mixed, preferably with an accelerator or curing agent without initiating substantial curing of the mixture. The composition is then injected into the tube bore preferable via injection port 41.

In one embodiment, core 53 includes metal pellets which add substantial strength and stiffness to core 53 although it provides a somewhat heavier torsion bar than where a non-metallic filler is used. Where the filler material comprises metal pellets, from about 60 to about 90% by weight of core 53 consists of metal pellets. Preferred metal pellets have a diameter of from about 0.010 inch to about 0.080 inch. The metal pellets may be any shape, including irregular shapes. In one embodiment, it is preferred to use from about 3 to about 15% nonmetallic filler and from about 70 to about 85% metal pellets by weight of core 53. Preferrred metals for use in forming metal beads for use in the present invention are steel, iron, and aluminum. Virtually any formable metal is suitable. The metal pellets are used primary for acoustic applications where stiffness is a priority.

One important feature of providing core 53 in place in the tube before the tube is actually bent into the shape of torsion bar 30, is that core 53 prevents the tube from collasping during the forming process. This is achieved in two different manners depending on whether core 53 is formed in place by the injection of a liquid material into the tube or is preformed or precast and then inserted into the tube. Where the preferred liquid mixture is injected into the tube, the mixture is preferably heated in place in the tube to approximately 180 degrees to approximately 250 degrees for approximately 5 to about 15 minutes to gel core 53. Before the torsion bar forming operation, that is, where the bends are formed, core 53 should be gelled sufficient to support the tube during the bending process to prevent collapse of the tube. Preferably, core 53 will have a percent tensile elongation of between 10% and 80% during the forming step. If the percent tensile elongation is less than 10%, core 53 may crack during the subsequent forming process. Alternatively, if the percent tensile elongation of core 53 is greater than 80%, core 53 may not have sufficient gel strength to support the tubing during the forming operations.

In that embodiment of the present invention in which core 53 is preformed or precast, it is preferred that the core be cured only to its B stage after which it is then inserted into the tube bore. Again, the precent tensile elongation of the precast core 53 should be below 10% to avoid cracking during subsequent processing. Where unexpanded thermally expandable microspheres are used as the filler material, it is preferred that they expand at a temperature above that at which the resin cures to B stage. In other words, it is preferred that the microspheres remain unexpanded until the precast is inserted into the tube bore. Following forming, to be discussed below, the precast undergoes final cure which causes the expandable microspheres in the precast to expand which provides a more rigid attachment of core 53 to the inner tube wall.

The most preferred composition for use in forming core 53 comprises an epoxy resin mixture, the constituents of which are available from Interez Corporation under the trademark "Epi-Rez" as follows (for convenience, the percentages of these constituents are expressed as percentages of the Epi-Rez 510 weight. In other words, one begins with a known weight of Epi-Rez 510 and then calculates the other ingredients as percentages of this known weight):

|  | % by Weight of 510 Resin |
| --- | --- |
| Interez Epi-Rez 510 | 100% |
| Interez Epi-Rez 507 | 25-50% |
| Interez Epi-Rez 855 | 50% |
| Organic or Inorganic Microspheres | 25% |
| Steel Pellets | 400% |

Alternatively, Epi-Rez 826 in an amount equal to about 25% of the Epi-Rez 510 resin weight may be provided in leiu of Epi-Rez 855 in the above mixture.

As an alternative to using a thermosetting resin as the resin component of core 53, a thermoplastic material such as polypropylene, thermplastic polyester, or polystyrene may also be used in the present invention. In those embodiments in which a thermoplastic material is employed, core 53 can be formed by injecting the thermoplastic in the liquid state into the tube bore and then hardening the thermoplastic material. Alternatively, it may suitable to form a precast of a thermoplastic material which is then inserted into the tube bore. The melting point of a suitable thermoplastic material should be greater than that which the material would encounter in subsequent events such as paint ovens and the like. The relative amounts of thermoplastic resin and filler in a thermoplastic resin based mixture would be higher than those set forth with respect to thermosetting resins by approximately 5–10% of resin weight, due to the higher melt viscosity of the thermoplastic resin. Volumetrically, the ratio of filler to thermoplastic resin is preferably about 1.5 to 2.5 filler to resin. The molecular weight ranges would also be similar.

In addition to those compositions set forth above for use in forming core 53, other resin based compositions which are suitable for use herein are disclosed in co-pending U.S. patent applications Ser. No. 837,624, now U.S. Pat. No. 4,737,407, filed Mar. 10, 1986, Ser. No. 811,041, now U.S. Pat. No. 4,751,249, filed Dec. 19, 1985, and 098,159 filed Sept. 18, 1987, which are assigned to the assignee of the present invention and the disclosures of which are incorporated herein by reference.

In more detail, and referring now to FIG. 4 of the drawings, a plurality of pellets 58 may be used to charge torsion bar 30 to form core 60. In this embodiment, the interstices 62 provide excellent acoustical dampening, although the strength of torsion bar 30 is greater using the aforementioned solid core 53. The preferred pellets for use in the present invention are those described in U.S. patent application Ser. No. 837,624, now U.S. Pat. No. 4,737,407. These pellets are preferably formed by mixing a thermoset resin such as an epoxy or a thermosetting polyester, with from about 15% to 35% organic or inorganic pre-expanded hollow microspheres, from about 1% to 10% unexpanded, thermally-expandable hollow microspheres, and an effective amount of a curing agent, with the percentages of microspheres being expressed as a percentage of the resin weight. Depending upon the resin which is used, the curing agent may comprise up to 50% by resin weight. Other agents such as wetting agents and the like may also be included.

Alternatively, pellets 58 may contain a blowing agent in lieu of unexpanded microspheres. The pellets are fabricated in accordance with the disclosure of the foregoing Ser. No. 837,624, now U.S. Pat. No. 4,737,407, application which includes the extrusion of the mixed ingredients in paste form onto an endless belt conveyor as a continuous strand. The strands are preferably heated on the conveyor to cure the resin component to the B-stage, whereupon the B-staged strand is cut into generally cylindrical pellets about one-eighth inch in length and diameter. The resin and unexpanded hollow microspheres or blowing agent are chosen such that the resin can be B-staged without substantially expanding the unexpanded hollow microspheres or activating the blowing agent. In this manner, the formed pellets are in a partially cured, unexpanded state. A thin coat of thermoset adhesive is then preferably applied to each pellet in a tumbling process which allows the adhesive coating to dry.

A preferred adhesive coating suitable for this purpose is formed by mixing a thermosetting resin with a curing agent and preferably an accelerator. For example, a preferred coating mixture is prepared by mixing Bisphenol A epoxy resin (available as "Interex 510"), with a "flexible" epoxy resin, (hydroxyl functionality for flexibility) such as Interez 507, with a high-temperature curing agent such as nadic methyl anhydride and an epoxy accelerator such as "DMP 30" available from Air Products Corp. The coating comprises from about 5–35 percent by weight of the coated pellets. In other words, in those instances where pellets 58 are coated, the pellets themselves comprise about 65–95 percent by weight and the coating makes up the remaining 5–35 percent by weight. A particularly preferred coated pellet comprises from about 0.1–10.0 percent by weight Bisphenol A epoxy resin, from about 0.0–10.0 percent by weight "Interez 507", from about 0.0 to 10.0 percent by weight nadic methyl anhydride and from about 0.0 to 1.0 percent by weight "DMP 30" with the pellet itself comprising 65–95 percent by weight of the coated pellet. Most preferred coated pellets comprise:

| Pellets | 84% by weight |
|---|---|
| Bisphenol A Epoxy Resin ("Interez 510") | 4.7% by weight |
| Flexible Epoxy Resin ("Interez 507") | 4.7% by weight |
| nadic methyl anhydride | 6.5% by weight |
| "DMP 30" | 0.1% by weight |

(Note, that a 50/50 w/w/ cured blend of "Interez 510" as "Interez 507" cured with methyl anhydride has a tensile elongation of about 7–10%).

Pellets 58, preferably after they have been coated, are loaded or packed into the tube bore. Pellets 58 are in contact with one another and with inner wall 62. A network of interstices 64 is formed due to the shape of pellets 58. Once pellets 58 are loaded into the tube bore, torsion bar 20 is heated to a temperature which first expands the unexpanded hollow microspheres, which in turn expands pellets 58, and then fully cures the B-staged resin to form syntactic pellets. Similarly, where a blowing agent is used instead of unexpanded microspheres, the blowing agent is activated to form cells in pellets 58 after which full cure of the pellets take place. It is to be understood that for the purposes of the present invention, both the microspheres and the blowing agent are cell-forming agents in pellets 58. The heat which is applied during this step also causes the adhesive coating of pellets 58 to bond to inner wall 62 and promotes interbonding between pellets 58. Hence, pellets 58 are only partially melted during this process and maintain sufficient body to retain the network of interstices in the fully-cured core 60. These interstices in the hardened core structure render core 60 acoustically superior to solid core 53 and, along with the cellular nature of pellets 58, serves to lighten torsion bar 20.

Numerous variations on the pellet construction as well as on the charging process will be appreciated from review of the foregoing copending patent applications and are intended to come within the scope of the present invention.

Hence, it is to be understood that before the tube is formed into the desired shape of a torsion bar, core 53 is preferably at an intermediate fabrication stage where the resin material is a thermosetting resin. Where a thermoplastic resin is used, it is generally necessary to soften the thermoplastic core by heating to prevent the core from cracking or breaking during the subsequent forming process. Thus, and referring now to FIGS. 1 and 2 of the drawings, the next step of the present invention, step 22, comprises cold forming torsion bar 30 to the desired shape. This is preferably carried out by forming torsion bar 30 into a body or spring portion 32 and a control or radius arm by forming angle 46. Radius arm 34 is of course adjacent wheel assembly 36 connected to support 48 in a vehicle suspension system. An angle or bend 38 for facilitating the connection of radius arm 34 to support 48 and an angle or bend 40 for facilitating the connection of spring portion 32 to frame 44 by means of anchor 42 are preferably provided. Again, in the preferred embodiments, core 53 is present at all bend areas including angle 46, bend 38 and bend 40. Flanges or the like may be formed at the ends of the torsion bar to facilitate attachment in a suspension system.

It is to be understood that the present invention also comprehends the fabrication of a torsion bar which does not have an integral control arm and further, that a separate control arm can be fabricated using the principles of the present invention.

Where a thermosetting resin is used to form core 53 which has been only partially cured before the cold forming process, core 53, and referring now to FIG. 1 of the drawings, is then subsequently fully cured. In one embodiment, core 53 is allowed to cure at ambient temperature. In the most preferred embodiment, torsion bar 30 is installed in a vehicle suspension system as shown in FIG. 2 of the drawings prior to the time at which the motor vehicle passes through a paint oven such as those typically used to cure the motor vehicle body paint. In this case, core 53 includes a heat curable, preferably B staged thermosetting resin. It will be known to those skilled in the art that paint ovens used in the manufacture of motor vehicles may reach temperatures of between 200 and 400 degrees F. Thus, core 53 may be cured as shown in step 26 by ambient cure of the reinforcement core 53 or alternatively by heating the torsion bar by step 24. Of course, where core 53 is cured at ambient temperature, the nature of the thermosetting resin should be such that it does not thermally degrade as the torsion bar passes through temperatures which are typically encountered in a paint oven. As core 53 is fully cured, it forms rigid bonds to the inner wall of torsion bar 30. As stated, core 53 is preferably provided at the bends in the torsion bar where stress is concentrated, in other words, at angle or bend 46, which is that portion of torsion bar 30 between the spring portion 32 and the radius arm 34, and at the bends formed in the torsion bar adjacent the ends of torsion bar 30. Of course, where torsion bar 30 is filled throughout its length by core 53, as will generally be the case in that embodiment where a liquid resin-based composition is injected into the bore of the tube, the core 53 will be present in all of the aforementioned stress areas. Alternatively, in the precast embodiments the precast core portions can be inserted from each end of the torsion bar to fill the critical stress points while leaving the majority of the torsion bar unfilled.

Where a thermosetting resin has been used to form core 53, after final cure such as when the torsion bar passes through a paint oven, the compression strength of core 53 is preferably greater than about 3000 psi. The percent tensile elongation is preferably between about 6% and 20%. Since the forming operations are completed prior to full cure, no further permanent deformation of the reinforcement material takes place and this lower tensile strength is acceptable, especially in light of the increased compression strength after curing. The stresses applied to torsion bar 30 during vehicle operation are twisting stresses which are resisted by the shear strength of core 53.

Also, and referring now to FIG. 3 of the drawings, core 53 forms a strong bond to inner wall 52 of torsion bar 30. As shown, although not necessarily to scale, core 53 most preferably comprises a plurality of hollow microspheres or metal pellets 54 in a resin binder 56.

As shown best in FIG. 2 of the drawings, torsion bar 30 when used in connection with a motor vehicle suspension system is attached in the customary manner to vehicle frame 44 and wheel assembly 36. Torsion bar 30 is generally attched via support arm 48 to wheel assembly 36. Spring portion 32 of torsion bar 30 is connected to frame 48 for journaling by a turning anchor 50 near bend 46 between spring portion 32 and radius arm 34 and rigidly at solid anchor 42 at that end of spring portion 32 which is opposite wheel assembly 36.

The above-described processes and embodiments provide a composite, tubular torsion bar formed preferably of medium or high strength steel having a resin-based core. In accordance with the present invention a hollow tube can be used to form a torsion bar which is made from lighter gauge and lower strength steel than other prior experimental hollow torsion bars. Since the need to strengthen the torsion bar by high-temperature heat treatment is eliminated, once formed, the torsion bar of the present invention maintains its formed geometry without risk of thermal distortion. Moreover, the lightweight core adds very little mass to the torsion bar, only about 10 to 30 percent, and yet the core effectively reinforces the bends in the torsion bar to prevent collapse as bending forces are applied to the bar. The core increases the stiffness of the torsion bar at the bends, or corners, which increases the overall performance or stiffness of the bar. The core also provides vibration damping and acoustic attenuation.

The process of the present invention is simple and reliable. The core acts as an internal mandrel during the bending process as a result of its tensile elongation characteristics and exhibits good compression and shear strengths which are important to performance of the torsion bar in the final assembly. Since the core is formed of a resin-based material, it acts to dampen vibrations received by the torsion bar from the wheel assembly or from the vehicle frame. If the bar is completely filled, the core eliminates the hollow space in the torsion bar which may otherwise act as resonance chamber.

EXAMPLE

A hollow metal tube approximately 20 inches long with an internal diameter of approximately ⅜ inch is provided with a core in accordance with the present invention in the following manner. Thermosetting pellets were provided which had been formed previously in accordance with the method disclosed in U.S. patent application Ser. No. 837,624, now U.S. Pat. No. 4,737,407, and as described in this patent specifications. In accordance with the present invention, a mixture was prepared which included bisphenol A epoxy resin (Interez 510), flexible epoxy resin (Interez 507), high temperature agent (Nadic Methyl Anhydride) and an epoxy accelerator (DMP 30). The aforementioned pellets were then coated with this mixture by placing a plurality of the pellets and the mixture in a rotating drum-type agglomerator until the pellets were uniformly coated with the mixture. The coated pellets comprised pellet, 84% by weight, "Interez 510", 4.7% by weight, "Interez 507", 4.7% by weight, nadic methyl andhydride, 6.5% by weight and "DMP 30", 0.1% by weight. While the pellet coating was still in th liquid state, the coated pellets were poured into the boar of the hollow tube, substantially filling the tube bore. The tube and pellets were then placed in an oven where they were heated at 350 degrees F. for approximately 30 minutes. The coatin and pellets were cured during the heating step to form a solid relatively air-permeable core as previously described. Acoustical dampening was measured with accelerometers at each end of the filled tube to measure vibrations when the tube was struck with an instrument. A hollow tube was used as the control. Vibration dampening was determined at both low and high frequencies. The dampening efficiency of the filled tubes was approximately twice as great in the filled tubes as hollow control tubes at both low and high frequencies.

It will be appreciated that the above embodiments of the preferred process of making torsion bars and torsion bars made thereby are intended as exemplary and not limiting sense. Within the broad scope of the appended claims, many variations, modifications and changes may be made in accordance with the present invention.

I claim:

1. A torsion bar for a suspension system comprising:
   an elongated tubular bar having a bore coextensive therewith;
   a solid core closely received within the bore of said elongated tubular bar;
   first means in association with one end of said elongated tubular bar for connecting said one end of said elongated tubular bar to a first portion of said suspension system;
   a second means in association with the other end of said elongated tubular bar for connecting said other end of said elongated bar to another portion of said suspension system; and
   said solid core is a substantially uniform mixture of a resin and a non-metallic filler.

2. The torsion bar recited in claim 1, further including an angle in said elongated tubular bar which defines a spring portion and a radius arm of said torsion bar.

3. The torsion bar recited in claim 2, wherein said suspension system is a motor vehicle suspension system and said first connecting means includes means for connecting said radius arm to a wheel assembly of said motor vehicle suspension system.

4. The torsion bar recited in claim 2, wherein said suspension system is a motor vehicle suspension system and said second connecting means includes a turning anchor and a solid anchor attached to the frame of said motor vehicle.

5. The torsion bar recited in claim 1, wherein said solid core substantially fills the entire length of said bore.

6. The torsion bar recited in claim 1, wherein said solid core consists of multiple inserts positioned along the length of said bore.

7. The torsion bar recited in claim 1, wherein said elongated tubular bar has a plurality of bends and wherein said solid core is positioned in said bore at said bends.

8. The torsion bar recited in claim 1, wherein said resin is a thermosetting resin.

9. The torsion bar recited in claim 1, wherein said non-metallic filler is glass microspheres.

10. The torsion bar recited in claim 1, wherein said non-metallic filler is plastic microspheres.

11. The torsion bar recited in claim 1, wherein said non-metallic filler is selected from the group consisting of fumed silica, calcium carbonate, milled glass fiber, and chopped glass strands.

12. The torsion bar recited in claim 1, wherein said solid core comprises from about 50 to about 75% by weight thermoset resin and from about 25 to about 50% by weight filler.

13. The torsion bar recited in claim 1, further including a layer of adhesive interposed between said solid core and said elongated tube such that said solid core is adhesively bonded to said elongated tubular bar in said bore.

14. The torsion bar recited in claim 8, wherein said resin is an epoxy resin.

15. A torsion bar for a suspension system comprising:
an elongated tubular bar having a borre coextensive therewith;
a core closely received within the bore of said elongated tubular bar;
first means in association with one end of said elongated tubular bar for connecting said one end of said elongated tubular bar to a first portion of said suspension system;
a second means in association with the other end of said elongated tubular bar for connecting said other end of said elongated tubular bar to another portion of said suspension system; and
said core including a plurlity of partially bonded-together pellets, said pellets including a thermosetting resin and a cell-forming agent.

16. The torsion bar recited in claim 15, further including an angle in said elongated tubular bar which defines a spring portion and a radius arm of said torsion bar.

17. The torsion bar recited in claim 16, wherein said suspension system is a motor vehicle suspension system and said first connecting means includes means for connecting said radius arm to a wheel assembly of said motor vehicle suspension system.

18. The torsion bar recited in claim 16, wherein said suspension system is a motor vehicle suspension system and said second connecting means includes a turning anchor and a solid anchor attached to the frame of said motor vehicle.

19. The torsion bar recited in claim 15, wherein said cell-forming agent includes hollow microspheres.

20. The torsion bar recited in claim 15, wherein said core consists of multiple inserts in said bore.

21. The torsion bar recited in claim 15, wherein said cell-forming agent includes a blowing agent.

* * * * *

UNITED STATES PATENT AND TRADEMARK OFFICE
CERTIFICATE OF CORRECTION

PATENT NO. : 4,836,516

DATED : June 6, 1989

INVENTOR(S) : Joseph Wycech

It is certified that error appears in the above-identified patent and that said Letters Patent is hereby corrected as shown below:

In the Abstract:

Line 8, delete "B-stage" and insert --B-staged--.

Line 16, delete "rein" and insert --resin--.

Column 1, Line 49, delete "bar" and insert --bar have--.

Column 1, Line 55, delete "of" and insert --of an--.

Column 2, Line 21, delete "a outer" and insert --an outer--.

Column 2, Line 65, delete "conpleted" and insert --completed--.

Column 3, Line 20, delete "hollor" and insert -- hollow --.

UNITED STATES PATENT AND TRADEMARK OFFICE
CERTIFICATE OF CORRECTION

PATENT NO. : 4,836,516

DATED : June 6, 1989

INVENTOR(S) : Joseph Wycech

It is certified that error appears in the above-identified patent and that said Letters Patent is hereby corrected as shown below:

Column 6, Line 15, delete "Again" and insert --Again,--.

Column 7, Line 59, delete "should" and insert --should not--.

Column 12, Line 4, delete "mateial," and insert --material,--.

Column 12, Line 32, delete "th" and insert --the--.

Column 12, Line 37, delete "tin" and insert --ting--.

Column 12, Line 49, delete "not" and insert --not in--.

Signed and Sealed this

Twenty-seventh Day of February, 1990

Attest:

JEFFREY M. SAMUELS

Attesting Officer     Acting Commissioner of Patents and Trademarks